Oct. 30, 1951 R. R. CURTIS 2,572,990
FAUCET
Filed July 5, 1946 2 SHEETS—SHEET 1
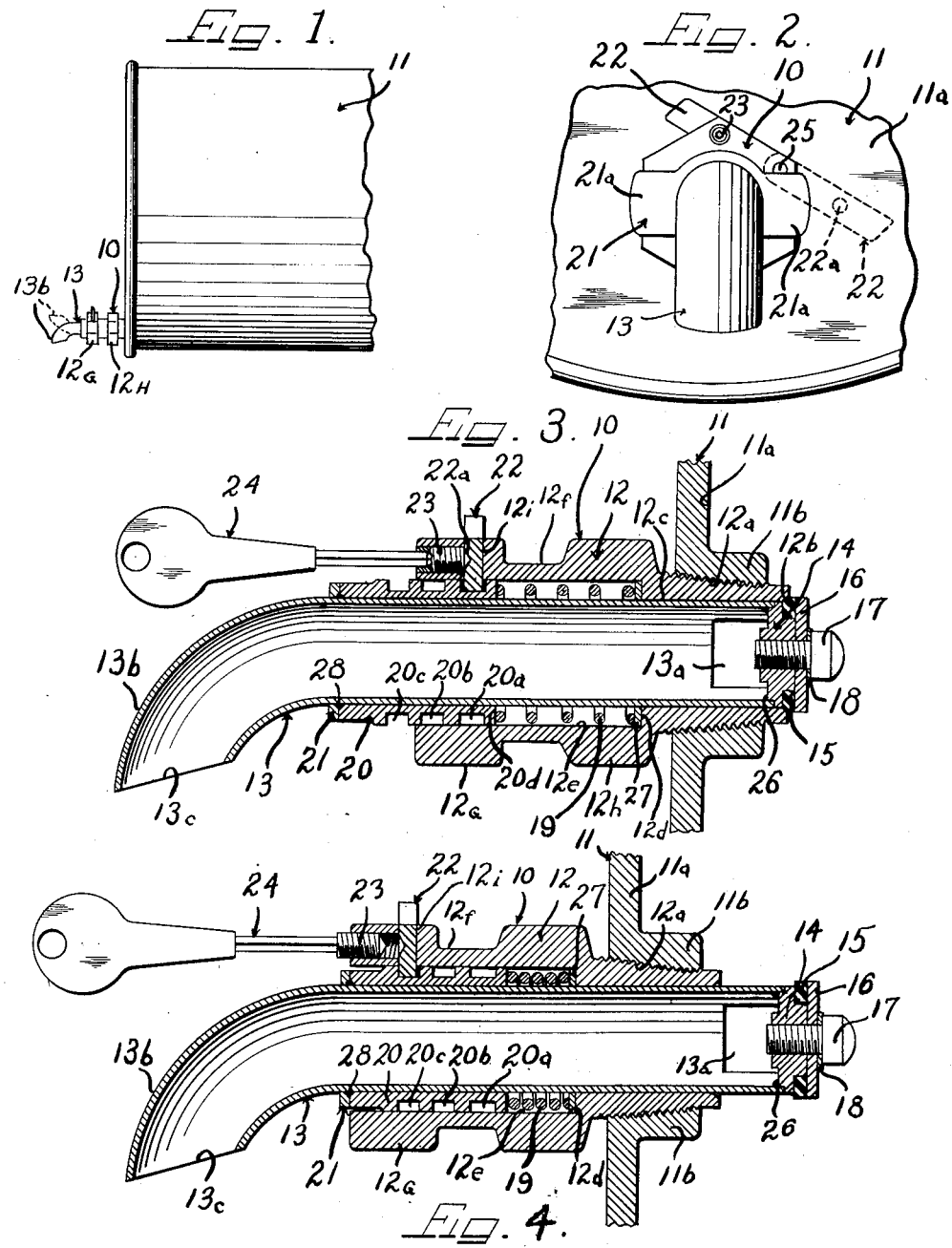
INVENTOR.
RUSSELL R. CURTIS
BY
*Attys.*

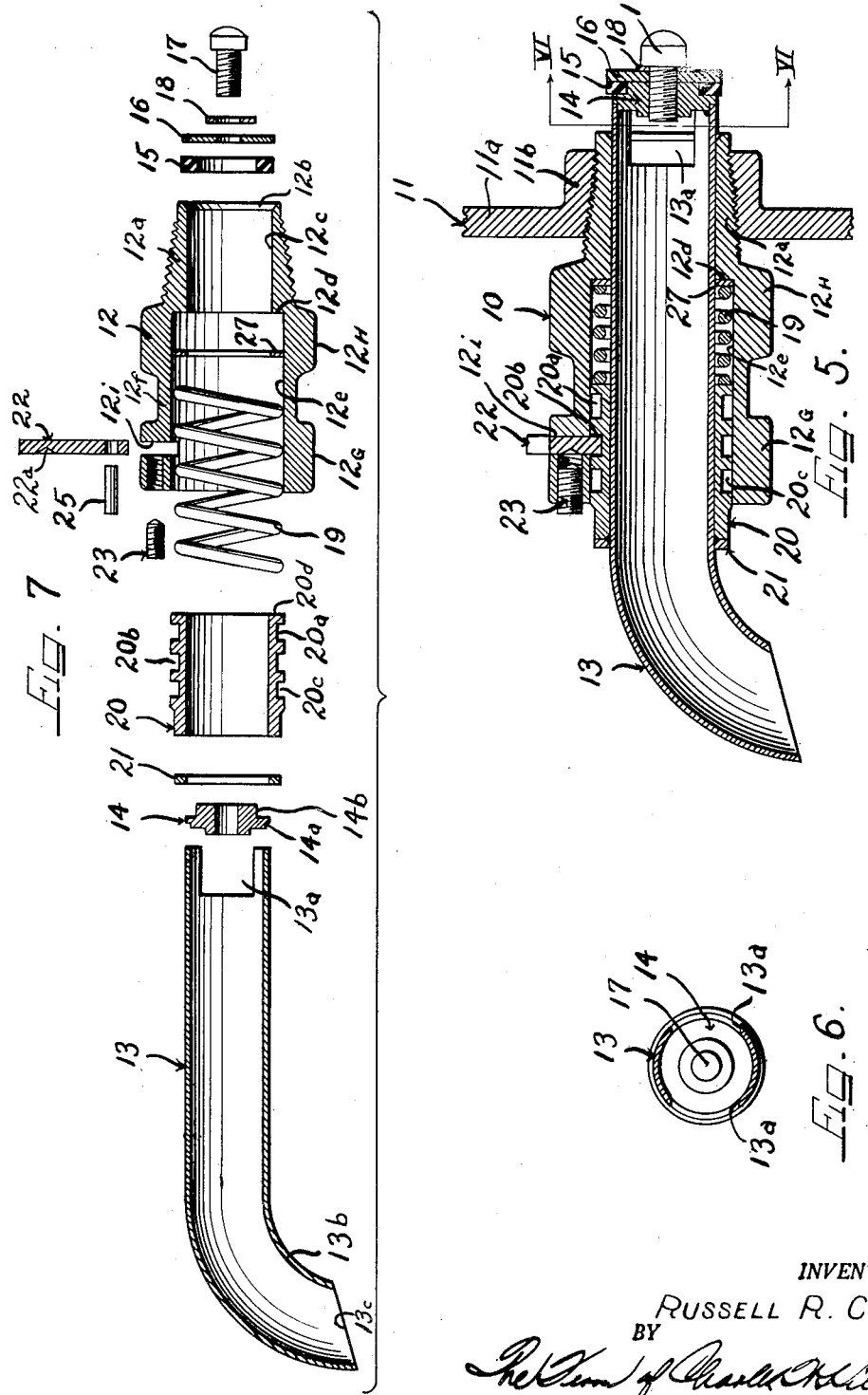

UNITED STATES PATENT OFFICE 2,572,990

FAUCET

Russell R. Curtis, Dayton, Ohio, assignor to Curtis Automotive Devices, Inc., Dayton, Ohio, a corporation of Ohio Application July 5, 1946, Serial No. 681,578

5 Claims. (Cl. 251—163)

This invention relates to a self-closing faucet composed of screw machine parts, a tube and a spring. Specifically the invention deals with a self-closing faucet especially adapted for barrels or drums wherein the nozzle of the faucet can be rotated to any desired position and can be locked in open or closed position by means of an attached device avoiding the necessity for a padlock.

While the invention will hereinafter be specifically described as embodied in a self-closing barrel or drum faucet, it should be understood that the invention is not limited to any particular usage since the principles of this invention deal generally with valve or faucet constructions.

According to the invention a one-piece body member is easily formed on a screw machine from hexagonal bar stock. The body member has a threaded end portion for threaded insertion in the plug of a drum or barrel. The hexagonal shape of the bar stock affords a head adapted to be engaged by a wrench to tighten the threaded end in the barrel or drum. The body has stepped bores therethrough with a shoulder between the bores. A tube slides in the smaller bore. A positioner member is telescoped on the tube and brazed thereto to slide in the larger bore. This positioner member has annular grooves therearound. A spring is compressed between the shoulder and the positioner member to urge the tube for moving a seal ring carried on the end of the tube against the end of the threaded portion of the housing. A lever member is pivoted on the body and fits in a slot provided therein to seat in one of the grooves of the positioner thereby locking the faucet in opened or closed positions. This lever is locked against swinging movement by means of a pointed screw threaded axially into the end face of the body and accessible only by means of a special tool. The screw and lever therefore cooperate to provide a lock for the faucet thus avoiding the necessity for additional padlocks or the like. The end of the tube carries a sealing ring and has ports therethrough adjacent the sealing ring so that when the tube is depressed into the housing against the spring pressure to move the sealing ring away from the body, these ports are exposed to permit flow of fluid through the tube.

A feature of this invention resides in the use of a single device attached to the body of the faucet for locking the faucet in closed position and for holding the faucet in a selected opened position.

A further feature of the invention is the provision of a readily replaceable rubber or rubberlike sealing ring on the tube to seal the faucet in closed position whereby a type of seal ring material best suited for the fluid being handled by the faucet can be selected.

An object of the invention is to provide a self-closing faucet having a nozzle that can be rotated to any desired position and held in open or closed position by an attached lever member.

A still further object of the invention is to provide a self-closing barrel type faucet that can be threaded home in the screw plug of a barrel or drum and still have the bent nozzle end thereof positioned as desired relative to the barrel.

A further object of the invention is to provide a self-closing faucet which is easily held in open position with an attached lever member.

A further object of the invention is to provide a self-closing barrel-type faucet which can be locked with an attached lever member, thereby avoiding the necessity for a padlock.

A still further object of the invention is to provide a self-closing faucet having selective degrees of opening.

Another object of the invention is to provide a faucet with a rotatable nozzle that can be turned up to prevent dripping.

Other features and objects of the invention will be apparent to those skilled in the art from the following detailed description of the annexed sheets of drawings which, by way of preferred example only, illustrate one embodiment of the invention.

On the drawings:

Figure 1 is a fragmentary side elevational view of a drum equipped with a faucet according to this invention.

Figure 2 is a fragmentary front elevational view of the drum and faucet shown in Fig. 1 and illustrating, in dotted lines, the open position of the faucet locking member.

Figure 3 is a longitudinal cross sectional view of the faucet in closed position and illustrating in elevation the locking key for the faucet.

Figure 4 is a view similar to Fig. 3 but illustrating the faucet in fully opened position.

Figure 5 is a view similar to Fig. 3 but illustrating the faucet in partially opened position.

Figure 6 is a transverse cross sectional view taken along the line VI—VI of Fig. 5.

Figure 7 is an exploded longitudinal cross sectional view, with parts in elevation, illustrating the manner in which the parts of the faucet of this invention are assembled.

As shown on the drawings:

As shown in Figs. 1 and 2, the faucet 10 of this invention is mounted on a metal drum 11, such as an oil drum. The drum 11 has a head or end face 11a which, as shown in Figs. 3 to 5, is equipped with an internally threaded boss 11b receiving the faucet.

The faucet 10 includes a body 12 slidably supporting a tube 13 providing the faucet nozzle. This tube 13 is closed by a disk 14 which carries a removable sealing ring or washer 15. A metal washer 16 overlies the removable sealing washer 15 and receives a cap screw 17 therethrough which is threaded into the disk 14 to retain the washer in position. A locking washer 18 is interposed between the washer 16 and head of the cap screw 17. A spring 19 is provided in the housing 12 and acts on a positioner tube 20 telescoped on the tube 13 for moving the sealing washer 15 against the end of the body 12 to close the tube. A pusher plate 21 is mounted on the tube 13 in front of the positioner 20. The plate 21 is adapted to be manually grasped for depressing the tube 13 into the housing to space the sealing washer 15 away from the end of the housing and thereby open the faucet. A lever member 22 is pivoted on the housing 12 and is adapted to coact with the positioner 20 to hold the tube 13 in a desired opened or closed position. A pointed set screw 23 is threaded in the end face of the housing 12 and coacts with the lever 22 to lock it in position. The locking screw 23 is of the socket head type and is actuated by a socket head screw driver 24.

The body member 12 is preferably composed of hexagonal bar stock and is readily lathe turned to provide the desired shape. As shown the body has a tapered threaded end portion 12a adapted to be screwed in the boss 11b. The end of the threaded portion 12a is provided with a beveled end face 12b forming a seat for the sealing washer 15. A cylindrical bore 12c is provided in the threaded end portion of the body and extends to a shoulder 12d in the body. A larger bore 12e extends from the shoulder 12d through the front face of the body. The exterior of the body can be further lathe turned to produce a cylindrical portion 12f between two unturned hexagonal heads 12g and 12h. The head 12h is adjacent the threaded end 12a and is adapted to be engaged by a wrench or other turning tool for rotating the body to thread the end 12a into the boss 11b.

The head 12g is at the front end of the body and has a slot 12i cut through one side thereof to communicate along this side with the bore 12e. The lever 22 fits in this slot 12i and is pivotally connected to the body by means of a pin 25. As shown the groove 12i is in one of the top side walls of the hexagonal body 12 and the pin 25 extends through the groove and through the lever 22 at the lower end of this top side wall. The lever is somewhat longer than the side wall and when seated in the groove projects beyond the body as shown in Fig. 2. The lever has a depression 22a in its front face adapted to receive the screw 23. This screw 23 as shown is threaded through the front face of the body at the upper end of the side wall containing the groove and is accessible only by means of a wrench for its socket head.

The tube 13 has slots 13a cut inwardly from the end thereof containing the closure member 14 to provide opposed ports in the end of the tube. The opposite end of the tube is bent at 13b to provide a nozzle. The end of the nozzle portion 13b is inclined at 13c to have its forward edge lower than its rearward edge thereby preventing formation of a bubble or film across the mouth of the nozzle.

The closure member 14 as best shown in Fig. 7 has a peripheral groove 14a adapted to receive the end edge of the tube 13. The closure member 14 is brazed to the end of the tube and a brazed bond 26 is shown in Figs. 3 to 5 to illustrate the integral connection between the closure member and the tube. The rear face of the closure member 14 also has a peripheral groove 14b therearound for receiving the sealing ring 15. The sealing ring 15 projects radially beyond the periphery of the closure member 14 and the washer 16 is bottomed on the closure member 14 but projects to the outer diameter of the sealing ring for backing up the ring when it is seated on the face 12b of the body.

The positioner 20 is a cylindrical lathe turned tube with a plurality of peripheral grooves 20a, 20b and 20c therearound. Each of these grooves is adapted to selectively receive the lever 22.

The positioner 20 slidably fits in the bore 12e of the housing and its end face provides a shoulder 20d in the housing. The spring 19 is maintained under compression in the bore 12e of the housing between this shoulder 20d and a sealing washer 27 bottomed on the shoulder 12d. This sealing washer 27 snugly fits around the tube 13 and prevents leakage from the bore 12c into the bore 12e.

The pusher plate 21 is bottomed on the front face of the positioner tube 20 and is a flat plate with radially extending arms 21a providing faces adapted to be readily engaged by the thumb for opening the faucet. A brazed bond such as 28 integrally unites the positioner tube 20 and the pusher plate 21 with the tube 13.

As shown in Fig. 3 of the drawings, the spring 19 when expanded forces the tube 13 toward the front face of the body 12 to seat the sealing washer 15 against the seating face 12b of the body. The end of the tube is thereby sealed and the faucet is in closed position. In this position the groove 20a of the positioner 20 is aligned with the slot 12i and if it is desired to lock the faucet in closed position the lever 22 is swung into the groove 12i to seat in the groove 20a of the positioner. The lever 22 will cooperate with the groove 20a to prevent shifting of the tube 13 and to hold the tube in its closed position. If it is desired to fixedly lock the lever 22, the locking screw 23 is driven home into the notch 22a of the lever by means of the driver 24 and the lever is retained in the slot 12i in its locking position. Since the screw 23 has a socket head retracted into the end face of the body 12, it can only be rotated by a socket head driving tool and the tool 24 thereby serves as a key for the device. The faucet thus has an attached lock avoiding the necessity for a padlock.

As shown in Fig. 4 the faucet 10 is fully opened by pushing the pusher plate 21 toward the front face of the housing 12 to compress the spring 19 and to align the groove 20c of the positioner 20 with the slot 12i. The locking lever 22 is then dropped into this groove 20c and the faucet is held in fully opened position. In this position the ports or slots 13a of the tube project beyond the body 12 into the drum 11 and a free drainage path is provided through the tube.

If it is desired to drain the drum 11 at a slower rate than the full capacity of the faucet 10, the tube 13 can be held in a position between the fully opened position of Fig. 4 and the fully closed position of Fig. 3 by aligning the groove 20b of the positioner 20 with the slot 20i and by dropping the lever 22 in this groove as shown in Fig. 5. In this position the ports 13a of the tube are only partially projected into the drum to give drainage outlets of smaller area than the full capacity of the ports.

The positioner 20 therefore not only locks the faucet in closed or sealed position to prevent unauthorized drainage of the drum but also holds the faucet in selected open position. If the locking lever 22 is swung to the dotted line position shown in Fig. 2, the spring 19 will maintain the faucet in closed position but it can be held in the desired depressed position by manual force on the pusher plate to drain the drum at a selected rate.

From the above description it will be understood that the body of the faucet of this invention can be readily formed by screw machine operations on hexagonal bar stock. It will also be understood that the positioner 20 for the tube 13 can be formed on a screw machine. The tube 13 in turn can be conveniently bent from regulation tube stock. The other parts are easily stamped or coined. The faucet parts are assembled by brazing the pusher plate and positioner tube on the tube 13; by brazing the closure plug 14 into the end of the tube; by telescoping the spring 19 and sealing washer 27 around the tube and by inserting the assembly through the housing. The sealing washer 15 and backing up washer 16 are then mounted on the closure plug 14 and the assembly is held together in assembled relation. The sealing washer 15 is readily removed and replaceable with a desired type of washer depending upon the type of fluid in the drum.

As shown in Fig. 1 the faucet 10 can be driven home in the boss of the drum without regard to the position of the nozzle 13c of the tube since the tube can be rotated into the desired position. This rotatable feature makes possible the positioning of the tube end as shown in dotted lines in Fig. 1 to prevent drippage.

The lever 22 and associated screw 23 provide a lock without necessity for an added padlock.

It will, of course, be understood that various details of construction may be varied through a wide range without departing from the principles of this invention and it is, therefore, not the purpose to limit the patent granted herein otherwise than necessitated by the scope of the appended claims.

I claim as my invention:

1. A faucet comprising a hollow open-ended body having a threaded plug portion at one end thereof arranged for threaded insertion in a boss, a head on said body for facilitating rotation of the body to insert said plug portion in a threaded boss, a tube slidably mounted in said body and having a ported end adjacent the plug portion of the body, a wall closing the ported end of the tube, a sealing ring replaceably mounted on said wall and projecting laterally from said tube for engaging the end face of the plug portion of the housing, a compressed spring in said housing acting on said tube to urge the seal ring into engagement with said end face, means on said tube defining a plurality of longitudinally spaced peripheral grooves, said housing having a slot therethrough communicating with said grooves, a lever pivoted in said slot adapted to be selectively seated in one of said grooves for holding the tube in a selected position in said housing, and means threaded in said housing adapted to project into said slot for locking said lever in the slot.

2. A faucet comprising a hollow open-ended housing, a tube slidable and rotatable in said housing and projecting from both open ends thereof, said tube having ports adjacent one end thereof, means mounted on said one end of the tube arranged for closing the adjacent end of the housing, a spring for urging said means into engagement with said end of the housing, the other end of said tube being angularly disposed to provide a nozzle, said nozzle being rotatable into any desired position, said tube having a series of peripheral grooves therearound, and a lever pivoted to said housing and seatable in any one of said grooves for holding the tube in a selected open or closed position relative to the housing without interfering with rotation of the nozzle.

3. A fluid flow control device comprising a housing having one end arranged for threaded insertion in a tank or the like, a tube slidably mounted in said housing and projecting from both open ends thereof, means closing the end of the tube adjacent the end of the housing that is to be threaded into the tank, seal means on said end of the tube adapted to engage said end of the housing, ports in said tube adjacent said closing means, a spring acting on said tube to hold the seal means in engagement with the housing, said tube being depressible into said housing to move the ports beyond the housing for drainage of fluid through the tube, said tube having a plurality of longitudinally spaced grooves therearound, said housing having an elongated slot therein adapted to communicate with said grooves, a lever pivoted in said slot and adapted to be seated in one of said grooves for locking the tube against shifting movement relative to the housing, and screw means threaded through an end face of said housing for engaging said lever means to hold the lever means in the slot thereby locking the device.

4. A faucet comprising a body having a polygonal head and an axially extending plug portion with external threads thereon, said plug portion having an end face providing a valve seat, a small diameter bore extending through said plug portion, a larger diameter bore extending through said head portion, said bores coacting to provide a shoulder therebetween, a sealing washer seated on said shoulder, a tube slidably mounted in said small diameter bore, a positioner tube secured on said tube and slidably mounted in said large bore, said positioner tube having a plurality of axially spaced peripheral grooves therearound, a coil spring in said large diameter bore bottomed at one end on said sealing ring and at the other end on said positioner member, said polygonal head of the body having an elongated slot therethrough adapted to communicate with said grooves, a lever member pivotally mounted on said body and swingable into and out of said slot, a tapped hole through an end face of said body communicating with said slot, a socket head threaded pin in said tapped hole adapted to engage said lever for locking the lever in the slot, said tube having openings in the side wall at the end thereof that is seated in said plug portion of the housing, a back wall closing said end of the tube, a sealing ring seated on said back wall and adapted to engage said valve seat, washer means removably carried on said back wall to hold said sealing ring thereon, and said other end of the tube being turned at an angle relative to the tube for providing a nozzle, said tube being rotatable relative to said housing to dispose the nozzle end thereof in any desired position relative to the housing.

5. In a faucet having a slotted housing with a rotatable peripherally multiple grooved spring loaded axially shiftable flow tube therein having means associated with an end thereof to coact with the housing for controlling flow therethrough, the improvements of a lever pivoted in the slot of the housing and selectively seatable in the grooves of the tube to lock the tube against axial shifting movement in the housing for fixedly positioning the means relative to the housing to selectively maintain the faucet in open or closed condition, said spring load on said tube urging the tube in a direction for closing the faucet, and locking means carried by said housing to maintain said lever in seated position within said groove, said lever and said locking means preventing axial movement of said tube without interfering with rotational movement thereof.

RUSSELL R. CURTIS.

REFERENCES CITED

The following references are of record in the file of this patent:

UNITED STATES PATENTS

| Number | Name | Date |
|---|---|---|
| 545,066 | Fregeau | Aug. 27, 1895 |
| 564,242 | Burlich | July 21, 1896 |
| 909,790 | Herbert | Jan. 12, 1909 |
| 1,065,659 | Bohannon | June 24, 1913 |

FOREIGN PATENTS

| Number | Country | Date |
|---|---|---|
| 4,029 | Great Britain | Mar. 2, 1900 |
| 29,040 | Great Britain | Dec. 17, 1912 |